UNITED STATES PATENT OFFICE.

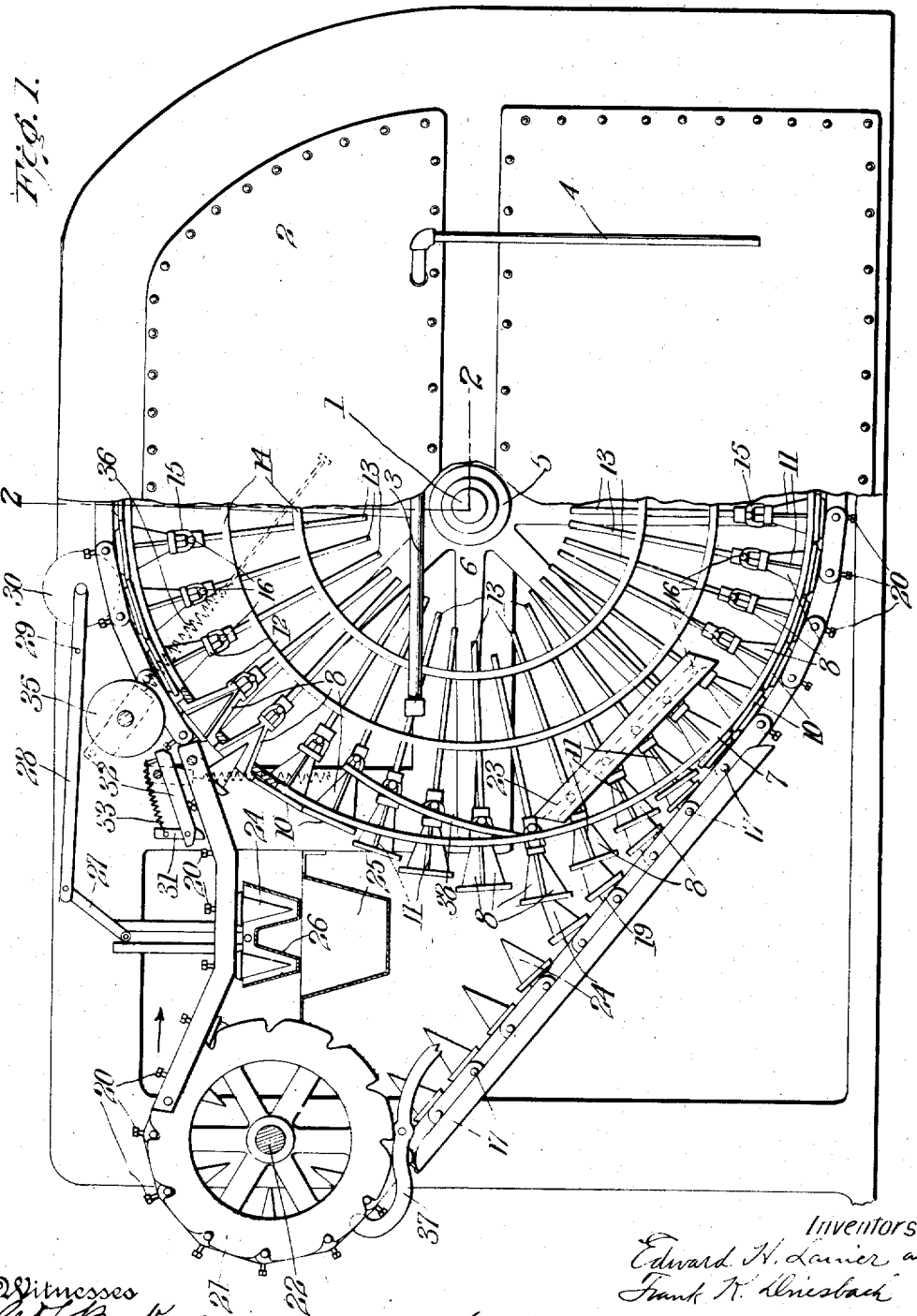

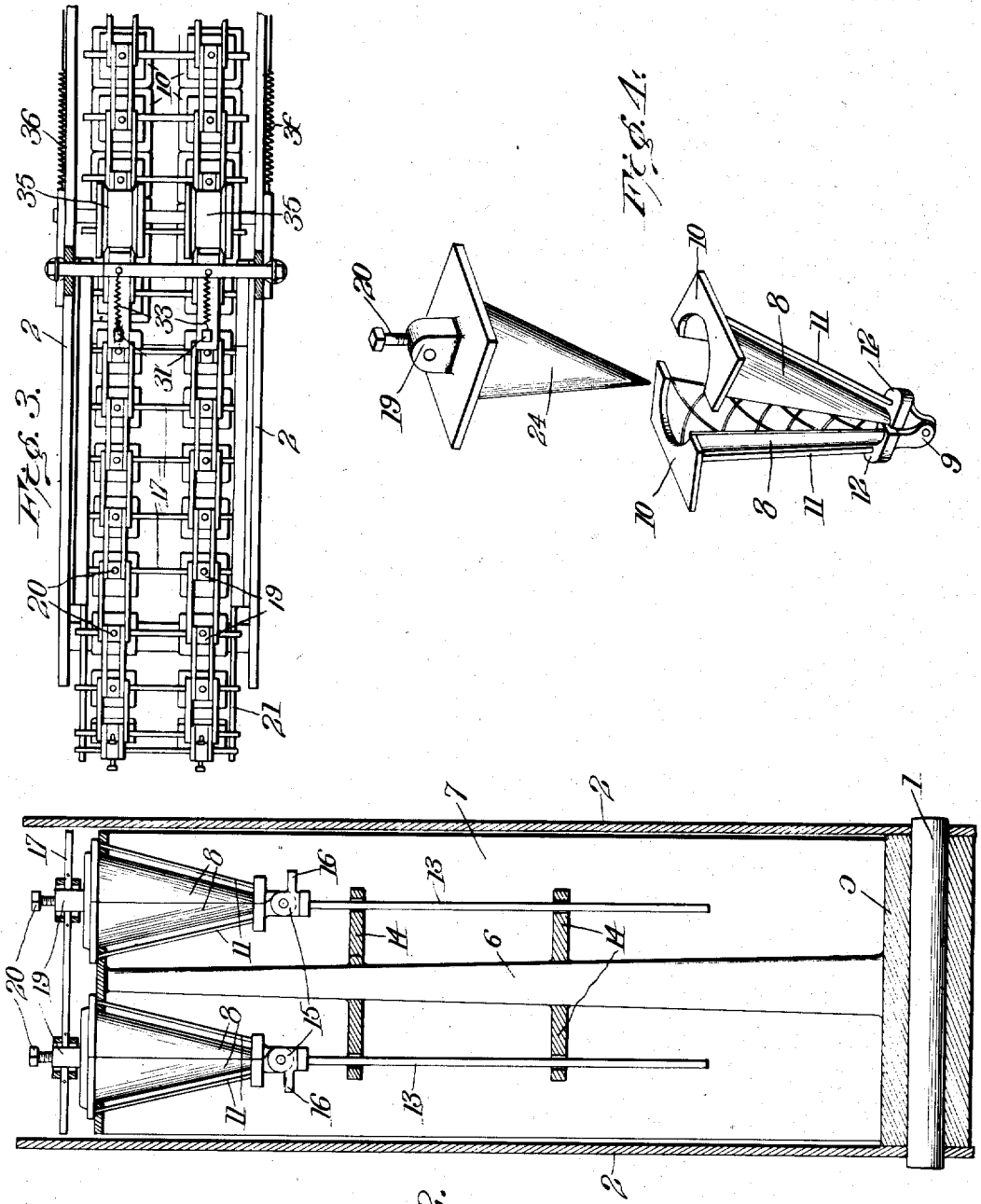

EDWARD H. LANIER AND FRANK K. DRIESBACH, OF CINCINNATI, OHIO.

PASTRY MOLDING AND BAKING APPARATUS.

1,257,498.  Specification of Letters Patent.  Patented Feb. 26, 1918.

Application filed June 12, 1914. Serial No. 844,717.

*To all whom it may concern:*

Be it known that we, EDWARD H. LANIER and FRANK K. DRIESBACH, citizens of the United States, residing at Cincinnati, Hamilton county, Ohio, have invented certain new and useful Improvements in Pastry Molding and Baking Apparatus, of which the following is a specification.

The present invention relates to improvements in machines for forming and baking hollow pastry and particularly to machines adapted for baking the articles commonly known as "ice cream cones."

The object of the invention is to provide a simple but effective machine by means of which large quantities of such articles may be produced in a minimum amount of time and without requiring particular attention from an attendant. That is, the object of the invention is to provide a machine for the purpose described which is automatic in its action.

In the accompanying drawings,

Figure 1 is an elevation, and partial section, with some of the parts broken away, of a machine constructed in accordance with the invention;

Fig. 2 is a sectional view substantially on the line 2—2 of Fig. 1, some of the parts of the mechanism being omitted for the sake of clearness;

Fig. 3 is a plan view of a part of the mechanism;

Fig. 4 is a detail view of one set of the molding devices;

Referring to the drawings, it will be seen that the machine comprises essentially a wheel or drum which is rotatably mounted upon a stationary axle 1, and provided with a series of mold cavities or sockets, and an endless carrier provided with a series of mold members corresponding to and adapted to enter the cavities or sockets in said drum, the carrier being supported by the drum and suitable driving wheels. The axle 1 is mounted in a suitable frame and the drum thereon is inclosed throughout the greater portion of its extent by a casing or housing 2 within which are arranged suitable burners, as indicated at 3, the gas or other fuel supply for said burners being admitted through a supply pipe 4.

As shown, the drum comprises a hub 5, spokes 6 and a rim 7, the latter projecting on both sides of the spokes and being provided with suitable openings to receive the socket or female members of the molding devices. Such members of the molding devices are preferably made in the form shown, comprising two sections or members 8 pivotally connected at their lower ends, as at 9, and having at the upper end expanded or projecting plate-like portions 10 which extend over the openings in the drum rim 7. Rods 11 connect the top members 10 of each mold section with lugs 12 at the lower end of the section, said rods extending through suitable openings in the drum rim and constituting a means for positively moving the two sections of each female member of a molding device to and from each other as said device is adjusted radially of the drum, as will be hereinafter more fully described. The drum is provided with two sets or series of molding sockets, arranged on opposite sides of the spokes 6 and each of said sockets is connected at its inner end with a rod 13 that extends through suitable passages in arms or plates 14, extending laterally from the spokes. The connection between each rod 13 and its associated molding device preferably includes a yoke-like member 15 and said yoke is provided with a lateral projection or stud 16 adapted to coöperate with stationary guides as the drum rotates to impart longitudinal reciprocating motion to the rods 13 and mold devices connected therewith.

The male members of the molding devices are supported by an endless carrier comprising two chains connected at proper intervals by cross bars or rock shafts 17, the molding cores 24 being suspended from or attached to said cross bars by heads 19, having therein apertures through which the cross bar extends, and set screws 20. The cross bars are of such length that they project laterally beyond both sides of the endless carrier and are adapted to engage the peripheral notches or teeth of drive wheels 21 mounted on a shaft 22 adapted to be driven by any suitable power, for example an electric motor. the shaft 22 is rotated so that the endless core supporting carrier moves in the direction of the arrow, Fig. 1, and means, hereinafter described, are provided for causing the cores to properly enter the socket members on the drum and rotate the same about the axle 1. At a suitable point stationary inclined guides 23 are provided, said guides having grooves through which the lugs or studs 16 on the female members of the molding devices are adapted to pass; and the guides 23 are so positioned that in traversing the grooves thereof said socket members will be positively moved radially of the drum and disengaged from the cores 24. Means are provided at points between the driving shaft 22 and the drum for coating the cores 24 with batter. As shown, this means comprises a tank or receptacle 25, in which a sufficient quantity of batter is constantly maintained when the machine is operating, and a vertically movable dipper 26 adapted to be lowered into the tank and therein filled with batter or to be elevated about cores 24. Preferably this dipper is provided with four chambers or pockets each adapted to receive one of the cores 24 and a sufficient quantity of batter to form one of the pastry receptacles. Any suitable means for reciprocating the dipper 26 may be provided. In the embodiment of the invention illustrated said dipper has upwardly extending side arms which are connected by a cross rod which is linked, as by a link 27, to the longer arm of a lever 28 fulcrumed at 29 on the frame-work of the machine. The shorter arm of the lever 28 is provided with a roller 30 that extends into the paths of the set screws 20 by which the cores 24 are secured to the endless carrier. Therefore, as the cores pass beneath the roller 30, the lever 28 will be actuated and the dipper 26 reciprocated to supply the proper coating of batter to the cores 24 which at that time are positioned above the batter receptacle 25.

It will be seen that the parts are so arranged as to cause the cores 24 to occupy a substantially vertical position while passing over the batter receptacle and, in order to insure that the coated cores will properly enter the mold sockets or cavities in the rotary drum, means are provided for rocking the supporting bars or shafts 17 after the cores have been coated with batter, as described. For this purpose, there are provided, in the path of each series of screws 20, tilting arms 31 which are pivotally mounted on guide shoes 32 and normally held by the action of springs 33 in the path of said screws 20. Referring to Fig. 1, it will be understood that as the screws 20 contact with the lower ends of the members 31 the tension of the spring 33 will be sufficient to cause the core supporting shaft 17 to rock in its bearings so that the screws may pass beneath the guides 32 and the cores be positioned at the proper angle to enter the mold sockets or cavities on the revolving drum. As the core carrier continues to move the tension of the spring 33 will be overcome and the member 31 rocked about its pivot so that the screw 20 in contact therewith can pass beyond said member, after which the spring 33 will return the member 31 to its normal, substantially vertical, position.

It is important that the coated cores be forced into the molds to the full extent and to effect this, there are provided two pressure rollers 35 adapted to contact with the enlarged plate-like heads of the cores 24 and under the influence of springs 36 insure proper register of the members of the molding devices.

As the drum revolves the batter between the cores and mold sockets will be baked and as the lugs 16 pass through the guides 23 the cores and mold sockets will be separated, the latter being withdrawn and the baked articles remaining on the cores from which they are subsequently removed as will be described later on. The first movement of separation of the cores and mold sockets, due to the engagement of the lugs 16 and the guides 23, will act to impart a slight movement of the baked article on the core, owing to the engagement between the fluted or roughened interior face of the mold socket and the pastry. This will be sufficient to detach the cone from the base of the core. As the pins or lugs 16 travel through the grooves of the guides 23 and the mold sockets are moved radially outward the members thereof will be positively separated so that the baked cone is readily withdrawn from the mold socket on the core. At a suitable point between the plane of the shaft 22 and the point where the cores and mold sockets are thus separated stripping means are provided for positively lifting the cones from the cores. As shown, this means comprises a lever 37 at each side of the machine, the forward ends of said levers being provided with forks or prongs adapted to lightly engage the baked articles and at the rear ends said levers are connected or provided with enlargements adapted to be engaged by the projecting ends of the members 17 of the endless core carrier so that said levers 37 will be intermittently rocked to cause the engaged cones to be moved beyond the points of the cores. The cones thus discharged are received on a suitable slide or chute from which they are conveyed to one side of the machine.

In order to close the members of the mold sockets and return them to proper position to receive the coated cores as the drum revolves, stationary guides 38 are provided being so arranged that the pins 16 in traveling over the inner faces thereof will be forced radially toward the axis of the drum and thereby bring the mold sockets into closed position.

It is believed that the operation and advantages of the improved machine will be understood from the foregoing description in connection with the drawings and it will be seen that the invention provides a very simple automatic mechanism by which a relatively large number of hollow pastry forms can be produced and baked with a minimum amount of attention. Owing to the greater part of the machine being inclosed, the casing surrounding the entire mold socket drum except at the forward portion thereof, where the core carrier enters and leaves the same, the contents of each mold are similarly heated and the finished products will be of uniform color.

It will be understood that the proportions of the parts shown and other details may be varied without departing from the invention and also that, for the sake of clearness, some of the parts are shown more or less diagrammatically and in some of the views, for example Fig. 2, a number of parts which might be shown are omitted.

If necessary the mold sockets and cores may be greased so that the pastry will not tend to unduly adhere thereto. In practice it is not found necessary to grease the mold sockets frequently but the cores need such treatment at frequent intervals. Grease may be applied to the cores by any suitable means, such as a brush or cloth.

Having thus described the invention, what is claimed and desired to be secured by Letters Patent is:

1. In a machine for the purpose described, the combination of a series of cores, an endless carrier supporting said cores, a series of mold sockets each adapted to receive one of the cores during a portion of the travel thereof, and means for positively moving the mold sockets successively longitudinally of the cores therein, for the purpose described.

2. In a machine for the purpose described, the combination of a series of cores, an endless carrier supporting said cores, a series of bisected mold sockets each adapted to receive one of the cores during a portion of the travel thereof, and means for positively separating the sections of the mold sockets successively at a predetermined point in their travel, by a movement in the direction of the length thereof, for the purpose described.

3. In a machine for the purpose described, the combination of a series of cores, an endless carrier supporting said cores, a series of mold sockets mounted within the space surrounded by said carrier to rotate about a common axis and each adapted to be automatically opened and closed during their travel and to receive one of said cores during a portion of the travel thereof, and means for positively effecting relative movement between the mold sockets successively and their contained cores while the sockets are closed, for the purpose described.

4. In a machine for the purpose described, the combination of a drum provided with a series of peripheral mold sockets, an endless carrier extending about said drum, a series of cores supported by said carrier and adapted to move into and from the mold sockets in the drum as the carrier travels, batter supplying means, and means for heating the mold sockets.

5. In a machine for baking hollow pastry forms, the combination of a rotatable drum provided with a series of peripheral mold sockets, an endless carrier extending about said drum, cores attached to said carrier and adapted to move into and from mold sockets in the drum as the latter rotates, batter supplying means, means for heating the mold sockets, and means for positively moving the mold sockets radially of the drum at a predetermined point in the rotation thereof, for the purpose described.

6. In a machine for baking hollow pastry forms, the combination of a rotary drum provided with a series of peripheral mold sockets, a driving means at one side of the drum, an endless carrier extending about the drum and about the driving means, cores carried by said carrier and adapted to move into and from mold sockets in the drum as the carrier travels, means for supplying batter to the cores, means for heating the mold sockets, and means for positively moving the mold sockets successively radially of the drum, for the purpose described.

7. In a machine for baking hollow pastry forms, the combination of a rotary drum provided with a series of bisected peripheral mold sockets, a driving means, an endless carrier extending about the drum and about the driving means, cores carried by said carrier and adapted to move into and from mold sockets in the drum as the carrier travels, means for supplying batter to the cores, means for heating the mold sockets, and means for positively separating the sections of the mold sockets successively, for the purpose described.

8. In a machine for baking hollow pastry forms, the combination of a drum provided with a series of peripheral mold sockets, a power wheel, an endless carrier extending about said wheel and drum, a series of cores on said carrier adapted to move into and from the mold sockets of the drum as the carrier travels, a batter receptacle over which the cores travel when disengaged from the sockets, means for transferring batter from said receptacle to the cores thereover, means for heating the mold sockets, and means for positively effecting relative movement between the sockets successively and the cores therein, for the purpose described.

9. In a machine for baking hollow pastry forms, the combination of a drum provided with a series of peripheral mold sockets, a supporting wheel, an endless carrier extending about said wheel and drum, cores on said carrier adapted to enter and move from the mold sockets on the drum as the carrier travels, means for positively forcing the cores into said sockets, and means for heating the mold sockets.

10. In a machine for baking hollow pastry forms, the combination of a drum provided with a series of peripheral mold sockets, a supporting wheel, an endless carrier extending about said wheel and drum, cores pivotally mounted on said carrier and adapted to move into and from the mold sockets of the drum as the carrier travels, batter supplying means, and means for heating the mold sockets.

11. In a machine for baking hollow pastry forms, the combination of a drum provided with a series of peripheral mold sockets, a supporting wheel, an endless carrier extending about said wheel and drum, cores pivotally mounted on said carrier, means for rocking the cores successively to cause them to enter mold sockets in the drum as the carrier travels, means for heating the mold sockets, and means for successively moving the mold sockets radially of the drum to disengage them from the cores and baked articles thereon.

12. In a machine for baking hollow pastry forms, the combination of a drum provided with a series of peripheral mold sockets, a supporting wheel, an endless carrier extending about said wheel and drum, cores pivotally mounted on said carrier, means for rocking the cores successively to cause them to enter mold sockets in the drum as the carrier travels, means for positively forcing the cores into the mold sockets, means for heating the mold sockets, and means for successively moving the mold sockets radially of the drum to disengage them from the cores and baked articles thereon.

13. In a machine for baking hollow pastry forms, the combination of a rotary drum having a series of peripheral radially movable mold sockets, a supporting wheel, an endless carrier supported by said wheel and drum, a series of cores on said carrier adapted to enter the mold sockets in the drum, batter supplying means, means for heating the mold sockets, and means for moving the mold sockets successively radially of the drum in opposite directions, substantially as described.

14. In a machine for baking hollow pastry forms, the combination of a rotary drum provided with a series of radially movable peripheral mold sockets, an endless carrier supported by said drum and a suitable wheel, cores on said carrier adapted to move into and from the mold sockets of the drum as the carrier travels, a batter receptacle, means actuated by the endless carrier for transferring batter from said receptacle to the cores, and means for heating the mold sockets.

15. In a machine for baking hollow pastry forms, the combination of a drum, a series of sectional mold sockets extending through openings in the periphery of the drum, an endless carrier, cores on said carrier adapted to move into and from the mold sockets as the carrier travels, batter supplying means, means for heating the mold sockets, means for moving the mold sockets radially outward and inward relative to the drum, and means for positively separating the sections of each mold socket during such outward radial movement, for the purpose described.

16. In a machine for baking hollow pastry forms, the combination of a series of sectional mold sockets connected to travel together about a horizontal axis, an endless series of traveling cores, each adapted to be received in one of the mold sockets, means whereby each core will be caused to successively enter a mold socket, travel therewith for a time and then be separated therefrom, means for supplying batter to produce articles to be formed between the cores and mold sockets, and means for heating the mold sockets.

17. In a machine for baking hollow pastry forms, the combination of a series of sectional mold sockets connected to travel together about a horizontal axis, an endless series of traveling cores, each adapted to be received in one of the mold sockets, means whereby each core will be caused to successively enter a mold socket, travel therewith for a time and then be separated therefrom, means for supplying batter to produce articles to be formed between the cores and mold sockets, means for heating the mold sockets, and means for separating the sections of the mold sockets successively after the article therein has been baked.

18. In a machine for the purpose described, the combination of a series of cores, an endless carrier for the cores, a series of mold sockets arranged within the space surrounded by said carrier and each comprising a plurality of relatively movable sections adapted to receive and surround one of the cores during a portion of the travel thereof, and means for successively effecting relative longitudinal movement of each core and its coacting mold socket while the sections of the latter are in closed position, to loosen the molded article from the core and thereafter moving the sections of each mold socket successively to open position.

19. In a machine for the purpose described, the combination of a drum-like revoluble body provided with peripheral mold sockets, each comprising a plurality of sections, an endless carrier extending partially around the drum, a series of cores on said carrier each adapted to enter and be retained in one of the mold sockets during a portion of the travel thereof, and means for successively effecting relative movement of each core and its mold socket while the sections of the latter are in closed position and thereafter successively moving the mold sockets bodily relative to the drum to open them.

20. In a machine for the purpose described, the combination of a series of cores, an endless carrier supporting the cores, a series of mold sockets each adapted to receive one of the cores during a portion of the travel thereof, and means for successively effecting relative movement between each core and its mold socket, to loosen the pastry from the core, the cores and mold sockets being subsequently separated and the pastry withdrawn from the mold sockets on the cores.

21. In a machine for the purpose described, the combination of a series of cores, an endless carrier supporting the cores, a series of mold sockets each adapted to receive one of the cores during a portion of the travel thereof, means for successively effecting relative movement between each core and its mold socket, to loosen the pastry from the core by movement in the direction of the length of the cores, the cores and mold sockets being thereafter separated to withdraw the baked pastry from the mold sockets on the cores, and means for removing the baked articles from the cores.

22. In a machine for the purpose described, the combination of a series of cores, an endless carrier connecting and supporting the cores, a series of mold sockets each adapted to receive one of the cores during a portion of the travel thereof, and means adapted to automatically effect relative movement between each core and its mold socket, to loosen the article thereon from the core, subsequently separate the cores and mold sockets, and withdraw the shaped article from the mold sockets on the cores.

23. In a machine for the purpose described, the combination of a series of cores, an endless carrier connecting and supporting the cores, a series of mold sockets each adapted to receive one of the cores during a portion of the travel thereof, means for successively and automatically effecting relative movement between each core and its mold socket, to loosen the article thereon from the core, by movement in the direction of the length of the core, and subsequently separating the mold sockets and cores to withdraw the articles from the mold sockets on the cores.

24. In a machine for baking hollow pastry forms, the combination of a series of mold sockets supported to move together about a horizontal axis and each comprising a plurality of sections, a series of cores connected to travel together and so related to said mold sockets that each will be received in one of the mold sockets during a portion of its travel, means for successively opening and closing the mold sockets and effecting relative movement between each mold socket and the core therein in the direction of the length of the core, means for supplying batter to produce articles to be formed between the mold sockets and cores, and means for supplying heat to bake said articles.

In testimony whereof we affix our signatures in presence of two witnesses.

EDWARD H. LANIER.
FRANK K. DRIESBACH.

Witnesses:
EVA BUFFINGTON,
GERRIT J. RAIDT.